United States Patent
Ohta et al.

(10) Patent No.: US 6,504,880 B1
(45) Date of Patent: Jan. 7, 2003

(54) ASK MODULATION CIRCUIT

(75) Inventors: Takayuki Ohta, Aichi-ken (JP); Koji Aoki, Aichi-ken (JP); Yuichi Murakami, Aichi-ken (JP); Rikuo Hatano, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/384,334

(22) Filed: Aug. 27, 1999

(30) Foreign Application Priority Data

Aug. 28, 1998 (JP) ............................................ 10-243526

(51) Int. Cl.[7] .............................. H03C 1/52; H04L 27/04
(52) U.S. Cl. ...................... 375/300; 327/117; 332/149
(58) Field of Search .................................. 375/268, 295, 375/300, 320, 374, 376, 271, 302; 332/149, 144, 147; 327/117, 160

(56) References Cited

U.S. PATENT DOCUMENTS

| 3,647,967 | A | * | 3/1972 | Stein |
| 3,657,658 | A | * | 4/1972 | Kubo |
| 3,996,481 | A | * | 12/1976 | Chu et al. |
| 4,559,492 | A | * | 12/1985 | Baba et al. |
| 4,672,447 | A | * | 6/1987 | Moring et al. |
| 4,712,335 | A | * | 12/1987 | Nelson |
| 5,235,292 | A | * | 8/1993 | Endo et al. |
| 5,398,007 | A | * | 3/1995 | Yamazaki et al. ............ 331/46 |
| 5,724,105 | A | * | 3/1998 | Hatano |
| 5,937,339 | A | * | 8/1999 | Vigne ........................ 455/260 |

FOREIGN PATENT DOCUMENTS

| JP | 8-191218 | 7/1996 |
| JP | 10-13475 | 1/1998 |

* cited by examiner

*Primary Examiner*—Jean Corrielus
(74) *Attorney, Agent, or Firm*—Burns, Doane, Swecker & Mathis, LLP

(57) ABSTRACT

An Amplitude Shift Keying (ASK) modulating circuit includes an oscillation circuit generating a pulse oscillation having a given frequency. A frequency divider is provided having a binary counter unit and having at least an input terminal, an output terminal and a reset terminal. The frequency divider is active and inactive when the reset terminal thereof is applied with low and high levels of a transmission signal wave, respectively, and divides the pulse oscillation while the frequency divider is active. The transmission signal wave is modulated together with a carrier frequency which is identical to the divided frequency.

12 Claims, 3 Drawing Sheets

ASK MODULATION CIRCUIT

Japanese Patent Application No. 10-253526, filed on Aug. 28, 1998, is incorporated herein by reference in its entirety.

BACKGROUND OF THE INVENTION

1. Field of the Invention

The present invention is directed to an Amplitude Shift Keying (ASK) modulating circuit, and more particularly to an ASK modulating circuit used in a transmitter.

2. Related Art

Japanese Patent Laid-Open Publication No. Hei. 10(1998)-13475 discloses a conventional ASK modulating circuit. In this ASK modulating circuit, a switching device or transistor is interposed between a power source terminal of an oscillating circuit and a direct current power source. Repeatedly turning the switching device on and off by applying a two digit signal produces an ASK modulated wave at an output terminal of the oscillating circuit.

However, in the foregoing circuit, a floating capacitance depicted with a phantom line (shown in the 10-13475 Document) is generated, such that the oscillating circuit effectively contains a capacitor. So long as the capacitor is not charged to some extent, the oscillating circuit cannot oscillate or fails to emit a carrier wave. Thus, this circuit is not suitable for high speed transmission.

Japanese Patent Laid-open Publication No. Hei. 08(1996)-191218 discloses another ASK modulating circuit which is free from the foregoing drawback. However, this ASK modulating circuit requires, for ASK modulation, additional components such a FET in addition to an oscillator. Thus, this ASK modulating circuit becomes more complex than the foregoing ASK modulating circuit.

SUMMARY OF THE INVENTION

It is, therefore, a principal object of the present invention to provide an ASK modulating circuit without the foregoing drawbacks.

In order to attain the foregoing object, the present invention provides an ASK modulating circuit which comprises an oscillation circuit generating a pulse oscillation having a given frequency and a frequency divider. The frequency divider includes a binary counter unit having at least an input terminal, an output terminal, and a reset terminal. The frequency divider is active and inactive when low and high levels of a transmission signal wave, respectively, are applied to the reset terminal thereof. The frequency divider divides the pulse oscillation while the frequency divider is active. As a result, the transmission signal wave is modulated together with a carrier frequency which is identical to the divided frequency.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

Figure 1:
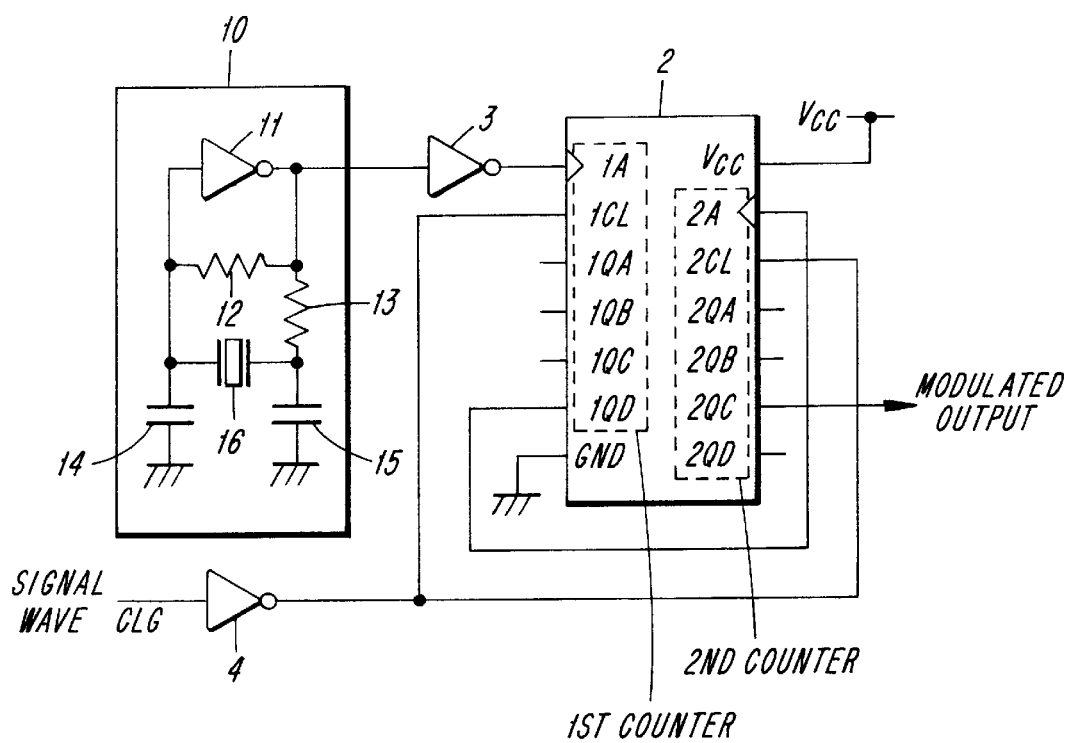
FIG. 1 is a block diagram of an ASK modulating circuit of an exemplary embodiment of the present invention.

FIG. 1 shows a block diagram of an ASK modulating circuit 1 which includes, as its major components, an oscillation circuit 10, an integrated circuit 2, a first inverter 3, and a second inverter 4.

The oscillation circuit 10, as can be seen from FIG. 1, has an oscillator 16, resistors 12 and 13, capacitors 14 and 15, and an inverter 11. A crystal or ceramics oscillator can be used as the oscillator 16, for example. The oscillation circuit 10 oscillates at a given frequency and the resultant pulse signal is fed via the first inverter 3 to a clock input 1A of the integrated circuit 2.

Figure 4:
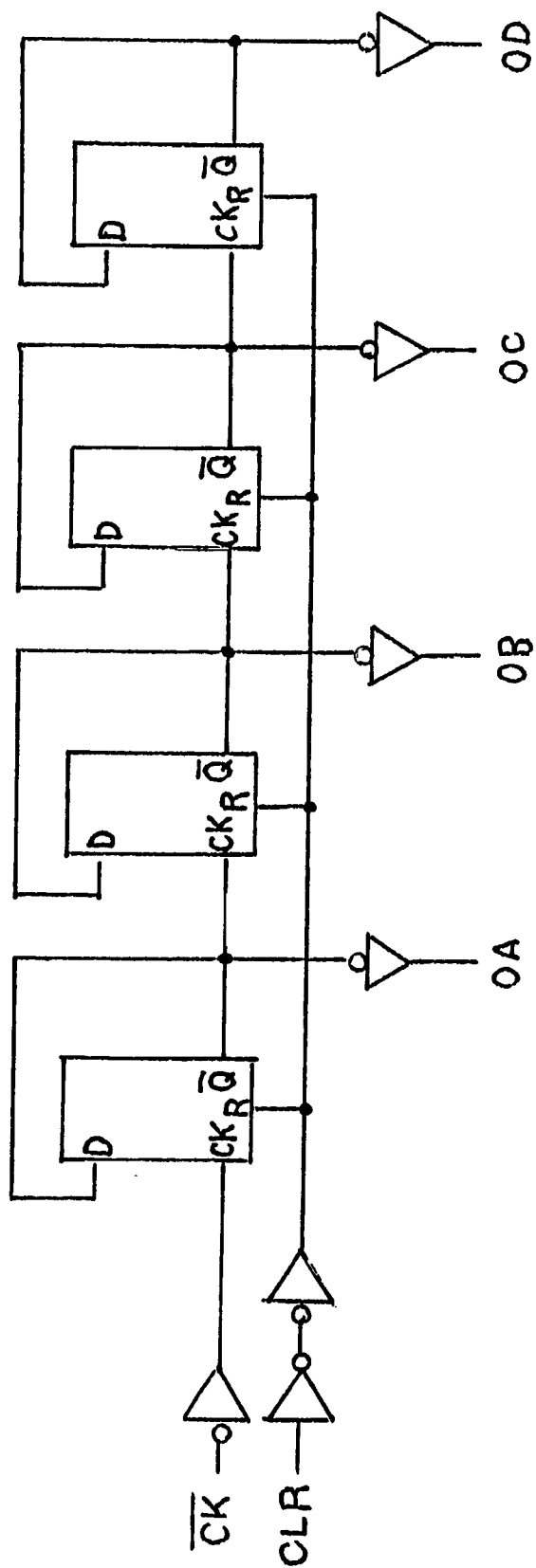
FIG. 4 is a partial block diagram of the integrated circuit of the ASK modulating circuit.

The integrated circuit 2 includes a binary counter unit, which, in turn, includes a pair of independent binary counters. The commercially available multiplexer 74HC393 (produced by National Semiconductor, Santa Clara, Calif.) can be used as the binary counter unit, for example. As shown in FIG. 4, an exemplary binary counter includes four in-series D flip-flops. A clock input signal is fed to the clock input terminals CK of the D flip-flops, while a clear signal is fed to the reset terminals R of the D flip-flops. The outputs of the four D flip-flops are labeled OA, OB, OC and OD, respectively.

Returning to FIG. 1, the integrated circuit 2 has a clock input 2A in addition to the clock input 1A, reset terminals 1CL and 2CL, dividing terminals 1QA, 1QB, 1QC, 1QD, 2QA, 2QB, 2QC, and 2QD, a ground terminal GND, and a voltage terminal Vcc. The prefixes '1' and '2' designate first and second counters, respectively, of the pair of binary counters. The first (primary positioned) binary counter operates as a frequency divider and provides, for example, divide ratios of 2, 4, 8 and 16. Therefore, if the inputted frequency at the clock input terminal 1A is "f," the resultant or divided frequencies f/2, f/4, f/8, and f/16 are provided at the respective terminals 1QA, 1QB, 1QC and 1QD. The GND terminal is connected to ground. A voltage of 5 volts, for example, is applied to the Vcc terminal to operate the integrated circuit 2.

In accordance with above-described structure, a pulse output of the oscillation circuit 10 passes through the inverter 3 and is then fed as an inverted signal to the clock input 1A of the integrated circuit 2. As discussed, the GND terminal is connected to ground and the Vcc terminal is connected to a 5 volt source. The input frequency f at the clock input 1A is divided into f/16 and the resultant frequency f/16 is fed from the terminal 1QD to the clock input 2A.

Further, a transmission signal wave CLG is inverted at the second inverter 4 and then fed to the reset terminals 1CL and 2CL of the integrated circuit 2. A modulated signal (modulated wave) is output at the terminal 2QC.

The foregoing ASK modulating circuit 1 can be used as a component of a transmitter of a keyless entry system. Assuming that it is desired that a transmission signal wave which contains an ID code, ID request code, etc., be modulated at a carrier frequency of 134.2 KHz, the oscillation frequency of the oscillator 16 is set to be 17.177 MHz. Such a frequency is fed to the clock input 1A, divided in the first binary counter, and a resultant divided frequency of 1.0736 MHz (17.177 MHz/16) is generated at the terminal 1QD of the first binary counter subject to the condition that the reset terminal 1CL is at a low voltage level.

Figure 2:
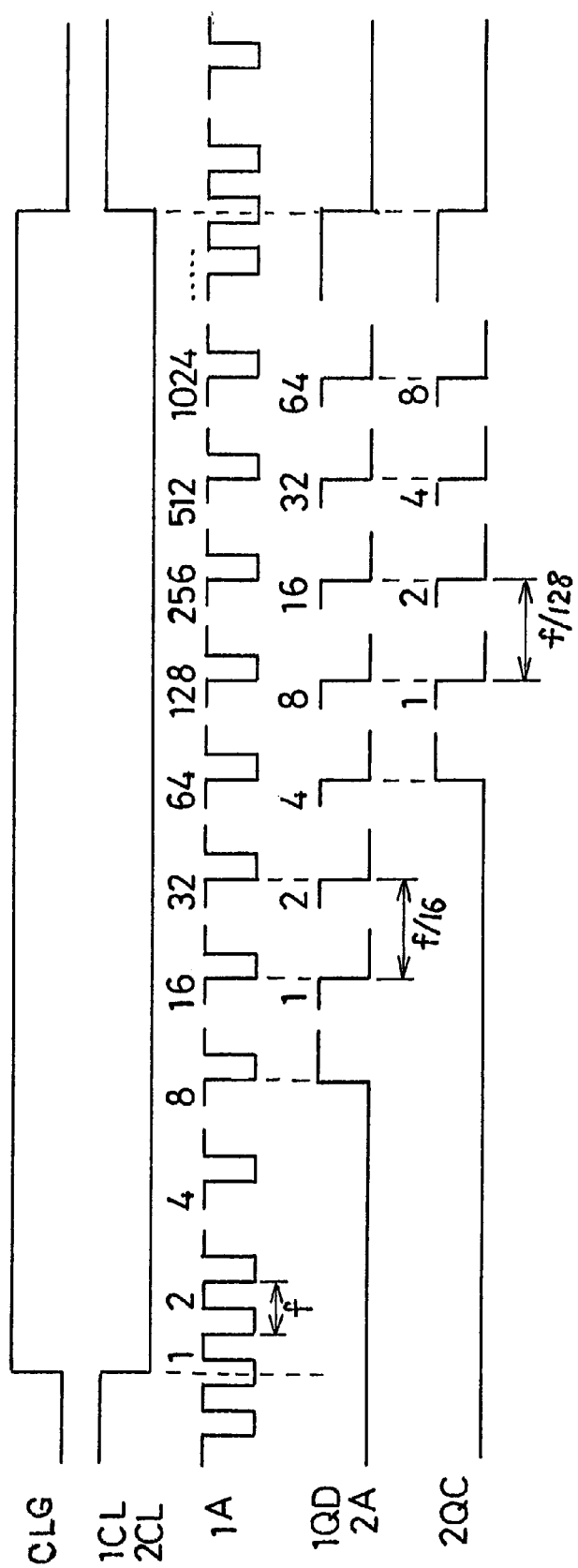
FIG. 2 is a view showing signal level conditions at terminals of an integrated circuit of the ASK modulating circuit.

The output signal of terminal 1QD having a frequency of 1.0736 MHz is fed to the clock input 2A of the second binary counter and divided by 8 when the reset terminal 2CL is at a low voltage level. The terminal 2QC then outputs the resultant or divided frequency signal of 134.2 KHz. Thus, the frequency at the terminal 2QC is 1/128 of the original frequency or the frequency at the clock input 1A. FIG. 2 shows one example of signals present at terminals 1CL, 2CL, 1A, 1QD, 2A and 2QC with respect to the signal CLG.

Figure 3:
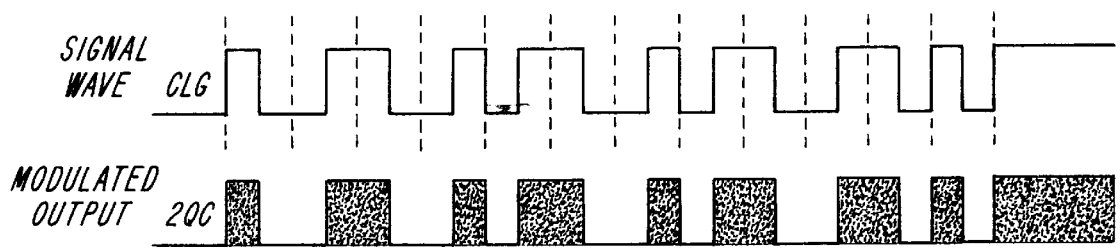
FIG. 3 is a view showing a transmission signal wave and a modulated wave of the ASK modulating circuit.

If a high voltage level is applied to the reset terminals 1CL and 2CL, the output at each of the terminals 1QA, 1QB, 1QC, 1QD, 2QA, 2QB, 2QC, and 2QD is fixed at a low level, which causes ASK modulation of a transmission signal wave at a carrier frequency of 134.2 KHz. This is illustrated in FIG. 3. That is, in FIG. 3, the modulated output signal at a carrier frequency output from the terminal 2QC is synchronized with the transmission signal wave CLG.

In the ASK modulating circuit 1, frequency dividing and modulation can be concurrently established using a configuration which is not complex. In addition, the oscillation is continual, which makes this ASK modulating circuit 1 suitable for high speed transmissions.

The invention has been described with reference to specific embodiments. However, the invention is not limited to the details and structure of the illustrated embodiments. Various modifications can be made without departing from the scope of the appended claims.

What is claimed is:

1. An ASK modulating circuit comprising: an oscillation circuit generating a pulse oscillation having a given frequency; and
   a frequency divider including a binary counter unit having at least an input terminal, an output terminal, and a reset terminal, the frequency divider being configured so that the frequency divider is active and inactive when low and high levels of a transmission signal wave, respectively, are applied to the reset terminal, and the frequency divider divides the pulse oscillation while the frequency divider is active, wherein the transmission signal wave is modulated together with a carrier frequency which is identical to the divided frequency.

2. An ASK modulating circuit as set forth in claim 1, wherein the oscillation circuit includes a crystal oscillator for generating the pulse oscillation.

3. An ASK modulating circuit as set forth in claim 1, wherein the oscillation circuit includes a ceramic oscillator for generating the pulse oscillation.

4. An ASK modulating circuit for generating a modulated output signal, comprising:
   an oscillation circuit generating a pulse oscillation having a given frequency as an output; and
   a frequency divider comprising a binary counter unit, said binary counter unit having:
      at least one input clock terminal for receiving the output of the oscillation circuit;
      at least one output dividing terminal for providing the modulated output signal; and
      at least one reset terminal for receiving a transmission signal wave,
   wherein the frequency divider is configured to be active or inactive depending on the level of the transmission signal wave and wherein the transmission signal wave is modulated together with a carrier frequency which is identical to the divided frequency, the result of which is said modulated output signal.

5. An ASK modulating circuit as set forth in claim 4, wherein the oscillation circuit includes a crystal oscillator for generating the pulse oscillation.

6. An ASK modulating circuit as set forth in claim 4, wherein the oscillation circuit includes a ceramic oscillator for generating the pulse oscillation.

7. An ASK modulating circuit for generating a modulated output signal, comprising:
   an oscillation circuit generating a pulse oscillation having a given frequency as an output;
   a frequency divider including first and second binary counters, each counter having at least an input clock terminal, a reset terminal, and at least one output dividing terminal;
   wherein the output of the oscillation circuit is connected to the input clock terminal of the first binary counter;
   wherein a transmission signal wave is applied to the reset terminals of both the first and second binary counters;
   wherein the at least one output dividing terminal of the first binary counter is connected to the input clock terminal of the second binary counter; and
   wherein the at least one output dividing terminal of the second binary counter constitutes the modulated output signal.

8. An ASK modulating circuit as set forth in claim 7, wherein each of the first and second binary counters has four dividing output terminals associated with dividing ratios of 2, 4, 8 and 16, respectively.

9. An ASK modulating circuit as set forth in claim 8, wherein the output dividing terminal of the first binary counter which is connected to the input clock terminal of the second binary counter has a dividing ratio of 16.

10. An ASK modulating circuit as set forth in claim 8, wherein the output dividing terminal which constitutes the modulated output signal of the second binary counter has a dividing ratio of 8.

11. An ASK modulating circuit as set forth in claim 7, wherein the oscillation circuit includes a crystal oscillator for generating the pulse oscillation.

12. An ASK modulating circuit as set forth in claim 7, wherein the oscillation circuit includes a ceramic oscillator for generating the pulse oscillation.

* * * * *